Sept. 5, 1967      E. J. ZDANUK      3,340,022
TUNGSTEN POWDER BODIES INFILTRATED WITH COPPER-ZIRCONIUM ALLOY
Filed April 21, 1966
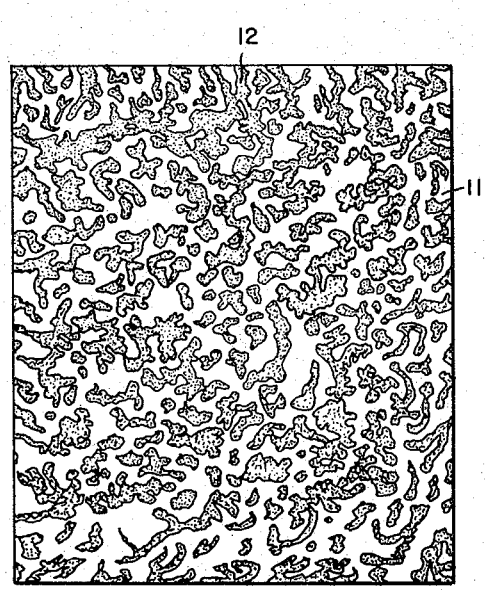
INVENTORS
RICHARD H. KROCK
EDWARD J. ZDANUK
BY *Robert Levine*
ATTORNEY

3,340,022
TUNGSTEN POWDER BODIES INFILTRATED WITH COPPER-ZIRCONIUM ALLOY
Edward J. Zdanuk, Lexington, and Richard H. Krock, Peabody, Mass., assignors to P. R. Mallory & Co. Inc., Indianapolis, Ind., a corporation of Delaware
Filed Apr. 21, 1966, Ser. No. 550,077
8 Claims. (Cl. 29—182.1)

ABSTRACT OF THE DISCLOSURE

A composite material for use as an electrical contact material in vacuum switching devices consisting of a tungsten powder body completely infiltrated with a copper-zirconium alloy matrix which has a high concentration of zirconium at the interface region between the tungsten particles and said copper-zirconium alloy matrix thereby raising the overall electrical conductivity of said copper-zirconium alloy matrix.

---

The present invention relates to powder metallurgy and more particularly to improved means and methods of providing composite materials for use as an electrical contact material.

It was found that using vacuum infiltration techniques, a copper-zirconium alloy, zirconium sandwiched between copper and a tungsten powder body subsequently heated to form a copper-zirconium alloy, a tungsten powder body coated with zirconium by electrolytic or vapor phase plating, and the like wet individual particles of the tungsten powder body so as to allow infiltration of the powder body with copper-zirconium. It is believed that the resultant composite body has a high concentration of zirconium in the interface region between the tungsten particles and the copper-zirconium alloy thereby raising the overall electrical conductivity of the copper-zirconium alloy matrix. The use of vacuum infiltration techniques also decreases the volume of hydrogen present in the resultant tungsten-copper-zirconium composite by more than an order and decreases the volume of all gaseous components by several orders.

Although complete and substantially instantaneous infiltration of copper into sintered tungsten bodies is conveniently carried out in an atmosphere of hydrogen, a copper melt shows no penetration into tungsten powder bodies in a vacuum atmosphere using comparable time-temperature treatments and using standard metallurgical procedures. In carrying out the present invention it was found that subjecting the tungsten powder body and a contacting copper-zirconium alloy to a vacuum infiltration process, the copper-zirconium alloy was absorbed into the tungsten body by capillary attraction. It is thought that the zirconium promotes wetting of the tungsten particles by the copper-zirconium alloy.

Tungsten is used in electrical contact materials because of its inherent characteristics of hardness and of resistance to arcing which reduce pitting of the tungsten contact material. However, pure tungsten contact material possesses high electrical resistance which lowers the efficiency and reliability of the tungsten contact material.

It has been suggested that a composite of tungsten-copper used as an electrical contact material would make advantageous use of the several outstanding characteristics of both metals. In the composite, the copper provides the current carrying capability and thermal conductivity while the tungsten contributes hardness, resistance to arc erosion, and superior anti-weld properties. In order to utilize the aforementioned characteristics of the copper and the tungsten, it is necessary to fabricate the metal into a tungsten-copper composite.

Copper and tungsten are mutually insoluble and form no alloys in the metallurgical sense, but mixtures of the two metals are usually referred to as alloys but are, technically speaking, composites. Composites of tungsten-copper may be prepared by pressing the mixed metal powders to the required shape in dies, and subsequently sintering in a hydrogen atmosphere above the melting point temperature of the copper, preferably between 1250° and 1350° centigrade. The hydrogen acts as a flux and the molten copper wets the tungsten particles and cements them together. Another method which provides a harder resultant body consists of first pressing and sintering the tungsten powder so as to form a coherent but porous body, which is then heated at a temperature of about 1200° C. to 1300° C. in a hydrogen atmosphere and in contact with molten copper. The copper is absorbed into the pores of the tungsten powder body by capillary attraction. The copper infiltrant imparts strength and ductility to the tungsten powder body and also provides the resultant body with higher current carrying capability and thermal conductivity. However, using standard metallurgical procedures, a copper melt shows no penetration into the tungsten powder body in a vacuum. It is thought that the lack of penetration of the copper into the tungsten powder body is due to the unfavorable surface energies that are present in the vacuum.

If there is no solubility between the metals as is the situation between tungsten and copper, and if the wetting is poor, an auxiliary agent for influencing the surface energies in the desired direction is required.

It was found that by utilizing small amounts of zirconium and by using vacuum infiltration techniques a melt of copper-zirconium completely infiltrated the tungsten powder body. It is thought the zirconium either raises the surface energies of the melt or of the solid, or lowers the surface energy of the interface between the melt and the solid thereby favoring infiltration of the melt into the tungsten powder body. It is thought the vacuum serves the dual purpose of allowing penetration of the copper-zirconium melt into the tungsten powder body and of significantly decreasing the volume of all gases present. However, the resultant tungsten-copper-zirconium contact material must contain a low volume of gas before the material is acceptable for application in vacuum environments.

Therefore, it is an object of the present invention to provide a composite material suitable for use as a contact material in vacuum electrical switching devices.

Another object of the present invention is to provide a composite material of tungsten particles in a matrix of copper-zirconium for use as an electrical contact material wherein the high electrical conductivity of the copper is not substantially decreased by the addition of zirconium.

Yet another object of the present invention is to provide a means and method of vacuum infiltrating a refractory material with an electrically conducting material thereby providing a composite contact material which is low in gas content and low in material which may be converted to gas during operation of the contact.

Yet still another object of the present invention is to provide means and methods of using a copper-zirconium alloy as infiltration stock for tungsten powder bodies so as to allow complete vacuum infiltration of the tungsten powder body thereby providing a composite contact material having integrally joined tungsten-copper-zirconium materials.

A further object of the present invention is to provide means and methods of fabricating a composite contact material using vacuum infiltration techniques, the composite contact material having high electrical and thermal conductivity, combined with low erosion under arcing and low deformation under pressure environments.

Another object of the present invention is to provide an alloy which includes an agent that wets the tungsten, that is ductile, that has high electrical and thermal conductivity, and includes a melting point that is lower than tungsten.

The present invention, in another of its aspects relates to novel features of the instrumentalities of the invention described herein for teaching the principal object of the invention and to the novel principles employed in the instrumentalities whether or not these features and principles may be used in the said object and/or in the said field.

With the aforementioned objects enumerated, other objects will be apparent to those persons possessing ordinary skill in the art. Other objects will appear in the following description and in the appended claims.

In the drawings:

The figure is a photomicrograph of about 500 magnifications of a tungsten-copper-zirconium composite contact material showing a sintered tungsten specimen completely vacuum infiltrated with a copper-zirconium alloy containing 0.25 percent by weight, zirconium. The infiltration was carried out at 1250° C. for 1 hour at a pressure of $10^{-5}$ torr.

Generally speaking, the means and methods of the present invention relate to an electrical contact material for use in a switching device such as, for example, in a vacuum electrical power switching means. The contact material consists of a tungsten body completely vacuum infiltrated by a copper-zirconium alloy. The copper-zirconium alloy consists of 0.5 to 0.05 percent, by weight, zirconium, the remainder copper.

The method of making a tungsten body infiltrated with an alloy of copper comprises the steps of compacting powdered tungsten particles into a desired body shape. The tungsten body is contacted with a copper-zirconium alloy which when heated above its melting point makes use of its ability as an agent for wetting the tungsten particles. The tungsten body and the contacting copper alloy are placed in a vacuum atmosphere and heated so as to completely vacuum infiltrate the tungsten body with the copper alloy by capillary attraction thereby forming a composite contact material.

More particularly, the means and methods of the present invention relate to fabricating a tungsten body infiltrated with an alloy of copper-zirconium for use as an electrical contact in vacuum environments. The tungsten powder has a particle size ranging between 1 and 10 microns and is compacted under pressure ranging from 20 to 35 tons per square inch into a desired body shape. The tungsten body may be presintered in a hydrogen atmosphere at about 1250° centigrade for about 10 minutes. The surfaces of the sintered tungsten body are contacted with an alloy of copper-zirconium. The copper-zirconium alloy consisted of about 0.05 to about 0.5 percent, by weight, zirconium, the remainder copper. The zirconium is used to promote the wetting of the tungsten particles by the copper-zirconium alloy. The tungsten body and the contacting copper-zirconium alloy are placed in a vacuum atmosphere having a pressure of about $10^{-5}$ torr and heated at a temperature of betwen 1250° and 1450° centigrade for a time duration of between 20 minutes and 60 minutes. The tungsten body is completely vacuum infiltrated with the copper-zirconium alloy thereby forming a tungsten-copper-zirconium composite for use as a contact material in vacuum environments.

In carrying out the present invention, it was found for a tungsten-copper system, an alloy of copper-zirconium having small amounts of zirconium when brought into contact with the tungsten bowder body in a heated vacuum environment resulted in the copper-zirconium completely infiltrating the tungsten powder body and forming a dense composite material. It is thought that the small amount of zirconium is sufficient to either raise the surface energies of the melt of copper-zirconium or of the tungsten particles or lower the surface energy of the interface between the melt and the solid.

The resultant composite is dense and has high electrical and thermal conductivity combined with a high resistance to deformation under pressure.

In forming the tungsten powder body, a suitable mold is utilized to form the tungsten powder into a desired shape. The size of the particles of tungsten may vary in accordance with the desired density of the composite contact material and with the desired pore size distribution of the composite contact material. For illustrative purposes, tungsten powder having a particle size of about 1 micron to 10 microns is utilized. However, it should be understood that tungsten powder having a larger or a smaller particle size may be used.

The tungsten particles are compacted within the confines of a suitable mold by a compacting pressure ranging between 20 and 35 tons per square inch thereby forming a porous tungsten body. If it is desired to further strengthen the tungsten body prior to infiltration and/or provide a composite having a higher tungsten content, the tungsten body may be sintered in an atmosphere of hydrogen at a temperature of about 1250° C. for a time duration of about 10 minutes. The figure shows a composite structure wherein the tungsten compact was presintered. After the preparatory treatment is completed, the strength of the tungsten compact is materially increased, and the compact can be handled readily. Very little grain growth takes place during the presinter treatment, and the increase in strength of the compact may be due to the reduction of the surface film of oxide on the individual tungsten particles, the reduced metal acting as a cement which binds the tungsten particles together.

It should be pointed out that the presinter of the tungsten compact in the hydrogen atmosphere is not a necessary prerequisite to the successful infiltration of the tungsten powder body with the copper-zirconium alloy.

The tungsten specimen, presintered or not, is placed in a vacuum having a pressure of $10^{-5}$ torr or less and contacted with a copper-zirconium alloy containing about 0.5 percent, by weight, or less of zirconium. The tungsten specimen and the contacting copper-zirconium alloy is heated to a temperature of between about 1200° C. to 1450° C. The range of temperatures exceeds the 1085° C. melting point temperature of the copper-zirconium alloy but is below the 3410° C. melting point temperature of tungsten.

A chemical analysis of the resultant composite body showed that vacuum processing decreases the volume of hydrogen by more than an order and decreases the volume of other gaseous components by several orders.

It is believed that an electron probe analysis of the region between tungsten particles will show a segregation or a high concentration of zirconium in the interface region between the tungsten and copper-zirconium alloy. This would explain how relatively small additions of zirconium can remain highly active during the extensive penetration of the tungsten body by the infiltrant.

With such a gradation in zirconium concentration in the copper-zirconium alloy, a much higher concentration of zirconium in the tungsten interface region than the nominal concentration in the infiltration stock is expected. The bulk of the region between the tungsten particles should contain a much lower concentration of zirconium than that used in the infiltration stock. Since zirconium in solid solution lowers the conductivity of copper, the zirconium segregation has a dual advantage, that is, in addition to efficiently promoting the wetting and infiltration in a vacuum environment, the segregation also raises the overall electrical conductivity of the infiltration alloy above that which would be expected from the nominal concentration of the infiltration stock.

Referring to the drawings, the figure illustrates a tungsten-copper-zirconium composite 10 consisting of a sintered porous compact of tungsten particles 11 which has been completely infiltrated by a coherent network of copper-zirconium 12. The metal surfaces of the copper-zirconium mixture are integrally bonded with the tungsten particles. The copper-zirconium alloy used to contact the tungsten powder body prior to vacuum infiltration contains about 0.25 percent, by weight, zirconium. During vacuum infiltration, the porous tungsten body and the contacting alloy were subjected to a temperature of about 1250° C. for about 60 minutes at a presure of $10^{-5}$ torr, or less.

The following Examples 1 to 3 are illustrative of the preparation of a tungsten-copper-zirconium contact material by vacuum infiltration of a tungsten powder body with a copper-zirconium alloy.

*Example 1*

A sintered tungsten body completely vacuum infiltrated by an alloy of copper-zirconium, the alloy containing about 0.25 percent, by weight, zirconium, the remainder copper.

Powdered tungsten having a particle size of about 1 to 10 microns was pressed by any suitable means such as by an automatic press at about 20 tons per square inch to provide a green compact sturdy enough to be handled. The green compact was presintered at about 1250° C. for about 10 minutes in an atmosphere of hydrogen so as to form a skeleton type structure. The presintering of the compact serves to increase the strength of the compact by cementing the tungsten particles each to the other thereby binding them together. The sintered porous compact is contacted with an alloy of copper-zirconium having a zirconium content of about 0.25 percent, by weight, the remainder copper. The sintered tungsten compact and the contacting alloy of copper-zirconium are placed in a vacuum atmosphere having a pressure of about $10^{-5}$ torr or less and are heated at a temperature of about 1250° C. for a time duration of about 1 hour. The porous tungsten body was found to be completely vacuum infiltrated by the copper-zirconium mixture. The resultant tungsten-copper-zirconium composite is illustrated in the figure of the drawing.

*Example 2*

A green tungsten powder body completely vacuum infiltrated by an alloy of copper-zirconium, the alloy of copper-zirconium containing about 0.5 percent, by weight, zirconium, the remainder copper.

Powdered tungstein having a particle size of about 1 micron to about 10 microns was pressed by any suitable means such as by an automatic press at about 20 tons per square inch to provide a green compact sturdy enough to be handled. The porous green compact is contacted with an alloy of copper-zirconium having a zirconium content of about 0.5 percent, by weight zirconium, the remainder copper. The green tungsten compact and the contacting alloy of copper-zirconium are placed in a vacuum atmosphere having a pressure of $10^{-5}$ torr or less and are heated at about 1250° centigrade for about 1 hour. The porous tungsten body was found to be completely infiltrated by the copper-zirconium alloy.

*Example 3*

A sintered tungsten body completely vacuum infiltrated by an alloy of copper-zirconium, the alloy of copper-zirconium containing less than 0.1 percent, by weight, zirconium, the remainder copper.

Powdered tungsten having a particle size of about 1 micron to about 10 microns was pressed by any suitable means such as by an automatic press at about 20 tons per square inch to provide a green compact sturdy enough to be handled. The green compact was sintered at a temperature at about 1250° centigrated for about 10 minutes in a hydrogen atmosphere. The sintered porous tungsten compact is contacted with an alloy less than 0.1 percent, by weight, zirconium, the remainder copper. The sintered tungsten compact and the contacting alloy of copper-zirconium are placed in a vacuum atmosphere having a pressure of $10^{-5}$ torr or less and heated at about 1250° centigrade for about 20 minutes. The porous tungsten body was found to be completely infiltrated by the copper-zirconium alloy.

It is thought that the tungsten powder body or the presintered tungsten body may be coated with zirconium by electrolytic or vapor phase plating, impregnation of the coated body could be carried out successfully with essentially pure (unalloyed) copper. Vacuum impregnation will occur as long as zirconium is at the boundary. The amount of plated zirconium would be such that its composition would amount to 0.5 to less than 0.1 percent by weight of that of the amount of copper required to fill the voids.

The present invention is not intended to be limited to the disclosure herein, and changes and modifications may be made by those skilled in the art without departing from the spirit and the scope of the present invention. Such modifications and variations are considered to be within the purview and the scope of the present invention and the appended claims.

Having thus described our invention, we claim:

1. A composite material having a low volume of gas content for use as an electrical contact material in vacuum switching devices consisting of tungsten particles surrounded by and integrally joined with an alloy matrix of copper-zirconium, said matrix having a high concentration of said zirconium in the interface region between said tungsten particles and said copper-zirconium alloy matrix thereby raising the overall electrical conductivity of said copper-zirconium alloy matrix.

2. The composite material having a low volume of gas content for use as an electrical material in vacuum switching devices of claim 1, wherein said alloy matrix consists of about 0.5 to less than 0.1 percent, by weight, zirconium, the remainder copper.

3. A composite material for use as an electrical contact material in vacuum switching devices consisting of a tungsten powder body completely infiltrated with a copper-zirconium alloy wherein said tungsten particles are surrounded by a matrix of said copper-zirconium alloy and wherein said matrix has a high concentration of said zirconium in the interface region between said tungsten particles and said copper-zirconium alloy matrix thereby raising the overall electrical conductivity of said copper-zirconium alloy matrix.

4. The composite material having a low volume of gas content for use as an electrical contact material in vacuum switching devices of claim 1, wherein said tungsten particles are presintered and have a particle size of about 1 to 10 microns.

5. A composite material having a low volume of gas content for use as an electrical contact material in vacuum switching devices consisting of tungsten particles substantially surrounded by a matrix of a copper-zirconium alloy, said alloy consisting of about 0.5 to less than 0.1 percent, by weight, zirconium, the remainder copper.

6. A composite material as claimed in claim 5, wherein said matrix has a high concentration of said zirconium in the interface reign between the tungsten particles and said copper-zirconium alloy matrix.

7. A composite material as claimed in claim 5, wherein said copper-zirconium alloy contains about 0.25 percent, by weight, zirconium, the remainder copper.

8. A composite material as claimed in claim 5, wherein said tungsten particles have a particle size of about 1 to 10 microns.

References Cited

UNITED STATES PATENTS

| | | | |
|---|---|---|---|
| 2,669,008 | 2/1954 | Levi | 29—182.1 |
| 2,842,438 | 7/1958 | Saarivirta et al. | 75—153 |
| 2,879,191 | 3/1959 | Nippert et al. | 75—153 |
| 3,069,757 | 12/1962 | Beggs et al. | 29—182.1 |
| 3,303,559 | 2/1967 | Holtzclaw | 29—182.1 X |

CARL D. QUARFORTH, *Primary Examiner.*

L. DEWAYNE RUTLEDGE, *Examiner.*

R. L. GRUDZIECKI, *Assistant Examiner.*